United States Patent [19]
Franklin et al.

[11] Patent Number: 5,823,223
[45] Date of Patent: Oct. 20, 1998

[54] RETROFITTABLE SAFETY SHUT-OFF VALVE FOR GAS OR LIQUID METER

[75] Inventors: Richard G. Franklin, Manhattan Beach; Robert Salazar, Rowland Heights; William Q. Osburn, La Canada, all of Calif.

[73] Assignee: Pacific Enterprises, Los Angeles, Calif.

[21] Appl. No.: 688,995

[22] Filed: May 1, 1996

Related U.S. Application Data

[63] Continuation-in-part of Ser. No. 566,548, Dec. 4, 1995, Pat. No. 5,603,345.

[51] Int. Cl.⁶ ................................................. F16K 17/36
[52] U.S. Cl. ................................................ 137/38; 137/39
[58] Field of Search ................................... 137/38, 39

[56] References Cited

U.S. PATENT DOCUMENTS

| | | | |
|---|---|---|---|
| 2,215,044 | 9/1940 | Kammerdiner | 137/38 |
| 2,585,316 | 2/1952 | Hobson | 137/38 |
| 2,703,582 | 3/1955 | Stepanian | 137/38 |
| 2,927,592 | 3/1960 | Ferre | 137/38 |
| 3,747,616 | 7/1973 | Lloyd | 137/38 |
| 3,768,497 | 10/1973 | Mueller | 137/38 |
| 3,878,858 | 4/1975 | Yamada | 137/38 |
| 4,091,831 | 5/1978 | Pazmany | 137/38 |
| 4,111,220 | 9/1978 | Winters | 137/39 |
| 4,212,313 | 7/1980 | Winters | 137/39 |
| 4,331,171 | 5/1982 | Novi | 137/45 |
| 4,336,818 | 6/1982 | Dauvergne | 137/38 |
| 4,382,449 | 5/1983 | Nelson | 137/38 |
| 4,485,832 | 12/1984 | Plemmons et al. | 137/38 |
| 4,565,208 | 1/1986 | Ritchie et al. | 137/38 |
| 4,603,591 | 8/1986 | Sibley et al. | 74/2 |
| 4,640,303 | 2/1987 | Greenberg | 137/38 |
| 4,715,394 | 12/1987 | O'Donnell et al. | 137/38 |
| 4,799,505 | 1/1989 | Nowell | 137/38 |
| 4,844,113 | 7/1989 | Jones | 137/39 |
| 4,889,150 | 12/1989 | Lloyd et al. | 137/39 |
| 4,903,582 | 2/1990 | McGill | 137/38 |
| 5,029,601 | 7/1991 | Reschke et al. | 137/38 |
| 5,052,424 | 10/1991 | Zerndt et al. | 137/1 |
| 5,052,429 | 10/1991 | Yoo | 137/38 |
| 5,209,252 | 5/1993 | Perle | 137/38 |
| 5,409,031 | 4/1995 | McGill et al. | 137/38 |
| 5,449,015 | 9/1995 | Petkovic | 137/38 |

FOREIGN PATENT DOCUMENTS

| 55-51179 | 4/1980 | Japan | 137/38 |
|---|---|---|---|

*Primary Examiner*—Gerald A. Michalsky
*Attorney, Agent, or Firm*—Lyon & Lyon LLP

[57] ABSTRACT

A safety valve for use in a meter through which gas or liquid may flow, the safety valve being activated to a closed position upon the disturbance of the system such as during an earthquake, thereby blocking the flow of liquid or gas. The valve may then be reopened by a reset assembly.

2 Claims, 8 Drawing Sheets

RETROFITTABLE SAFETY SHUT-OFF VALVE FOR GAS OR LIQUID METER

This application is a continuation-in-part of U.S. application Ser. No. 08/566,548, filed Dec. 4, 1995, now U.S. Pat. No. 5,603,345, and incorporated herein by reference.

FIELD OF THE INVENTION

The current invention relates generally to safety valves, and more particularly to a safety valve that may be used to stop the flow of gas or liquid through a meter or system in the event of a seismic or other disturbance.

BACKGROUND OF THE INVENTION

Many commercial and residential buildings are equipped with systems to receive natural or liquid petroleum gas to power various functions in the building such as heat or other appliances. These systems typically comprise an inlet gas line which provides gas from some remote source, a gas meter which may be coupled to the inlet gas line and which records how much gas is used in the building, and an outlet gas line which extends from the meter and into the building to feed other gas lines for various locations in the building. Similar systems are also typically used to deliver other gases or liquids such as water to the building, as well as to record the amount of such gas or liquid used.

Should the system which delivers gas or liquid to the building be disrupted, leaks could occur which may lead to explosion, fire, flooding or other potentially disastrous situations. Such a disruption could result from earthquakes which are quite common in California and other earthquake-prone locations, or from an accident where a vehicle crashes into the building or the gas or liquid delivery system itself. To protect against potential leaks that could arise from such disruption, safety valves have been proposed which seal off or close a gas line upon the occurrence of a disruption.

However, certain existing safety valves have one or more shortcomings which may limit their usefulness. For example, certain existing valves require various attachments to integrate the valves into the existing gas or liquid delivery system. This generally increases the complexity and cost of providing a safety valve feature in the first place and reduces the ability for the valve to be retrofitted into existing systems. As another example, other existing valves require various internal components, such as electronic or pressure differential sensors, that may again increase the cost and complexity of the valve and reduce its reliability. Yet other existing valves require a magnet to reset the valve into an open position. This in turn makes it difficult for the end user to reopen the valve with certainty and precision.

Accordingly, there is a need for an improved safety valve that is of simple design to increase its reliability and lower its cost thereby providing an incentive for using the valve in the first place. There is also a need for a safety valve which may be externally retrofitted into existing gas or liquid delivery lines with ease to reduce costs and maximize reliability.

SUMMARY OF THE INVENTION

In a first aspect of the invention, a safety valve which may block the flow of a liquid or gas upon the occurrence of a seismic or other disturbance is disclosed.

In another aspect of the invention, a safety valve which may be easily retrofitted into existing gas or liquid delivery lines is described.

In another aspect of the invention, a safety valve which uses the pressure of incoming gas or liquid to maintain the valve in a closed position is described.

In another aspect of the invention, a safety valve which may be mounted externally to a gas or liquid meter is described.

DESCRIPTION OF THE PREFERRED EMBODIMENTS

Figure 1:
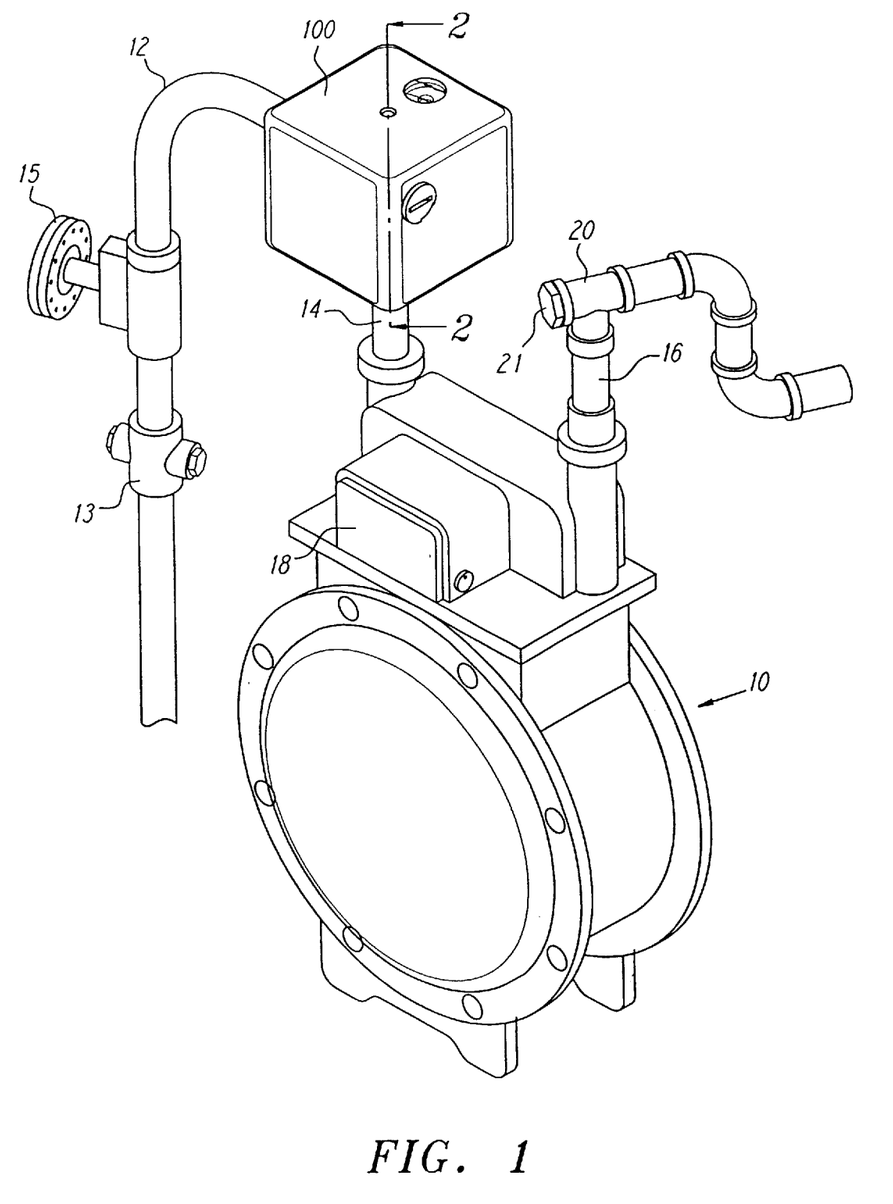
FIG. 1 is a perspective view of a gas meter and the safety valve mounted externally thereto.

FIG. 1 shows a typical gas meter 10 which includes the present safety valve 100, which in a preferred embodiment, is placed in the inlet line 12 upstream of meter 10. The valve 100 essentially operates such that if meter 10 is shaken, as might happen during an earthquake or some other extreme vibration or displacement, valve 100 closes and blocks the flow of gas. This avoids the continued flow of gas to possible leaks downstream of the meter, thereby reducing the risk of explosion or fire. Such closure also avoids wasting gas. As discussed later, the valve 100 may easily be reset to an open position to restore the flow of gas when it is safe or otherwise desired to do so.

While a gas meter is shown in FIG. 1, and reference is made throughout this disclosure to gas, the safety valve of the current invention may be used in connection with other types of gas or liquid meters, including but not limited to Sprague, American and Rockwell gas meters, as well as with water meters. It is thus not intended for the current invention to be limited to gas meters. Indeed the safety valve of the present invention may be used in conjunction with any gas or liquid delivery system, e.g. gas pipelines, tubes etc.

Referring still to FIG. 1, the line 12 is joined to a main shutoff valve 13, a pressure regulator 15, and then to the valve 100. The meter 10 includes a meter inlet line 14 to supply gas to the meter 10 from a remote source, and a meter outlet line 16 which provides gas to the building or other desired locations. The meter 10 includes internal components (not shown) between the meter inlet and outlet lines 14, 16 which serve to measure the amount of gas used for display on a gauge 18. The valve 100 is mounted externally to the meter 10 on the inlet side 14 of the gas line or the outlet side 16 of the gas line.

Figure 2:
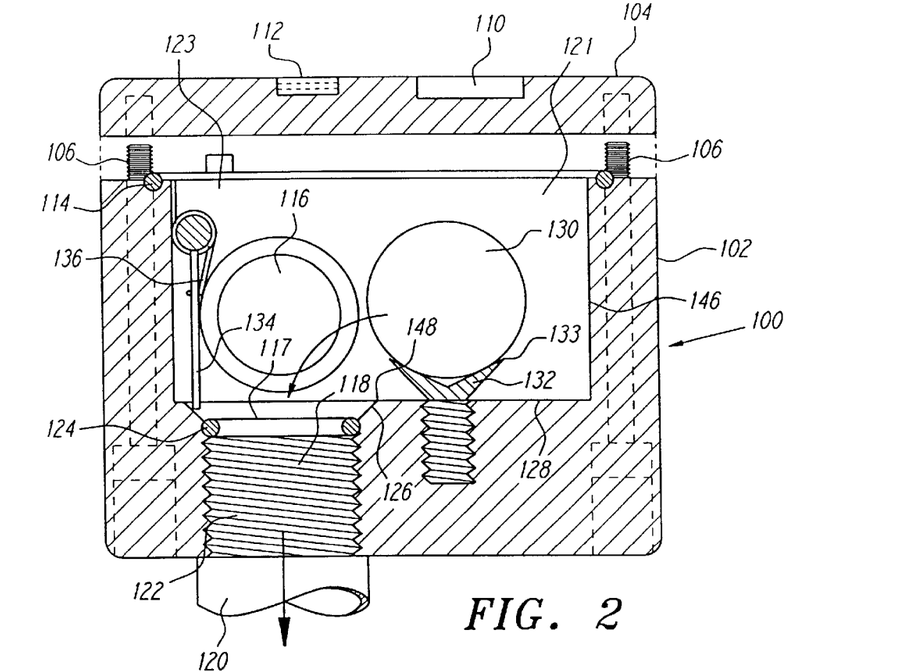
FIG. 2 shows a side section view of a safety valve in an open position along lines 2—2 of FIG. 1.
Figure 7:
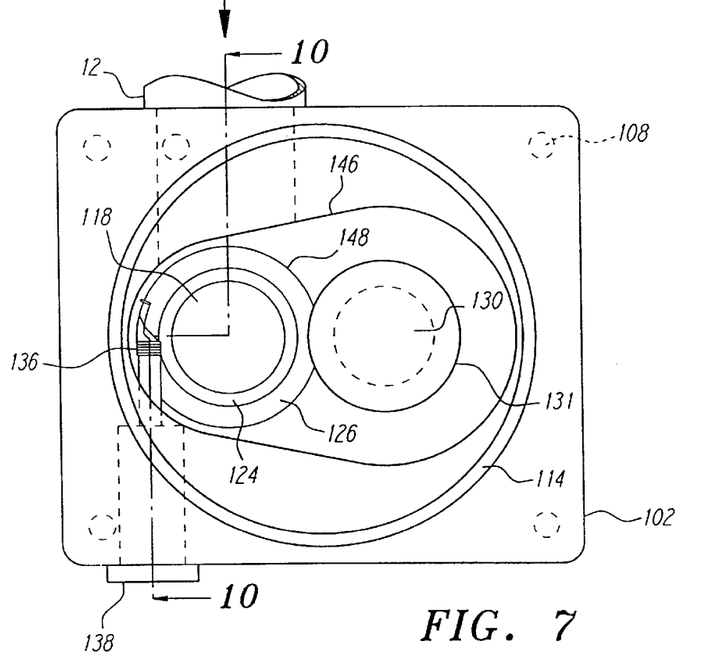
FIG. 7 is a top plan view of the safety valve in an open position with the valve lid removed.
Figure 8:
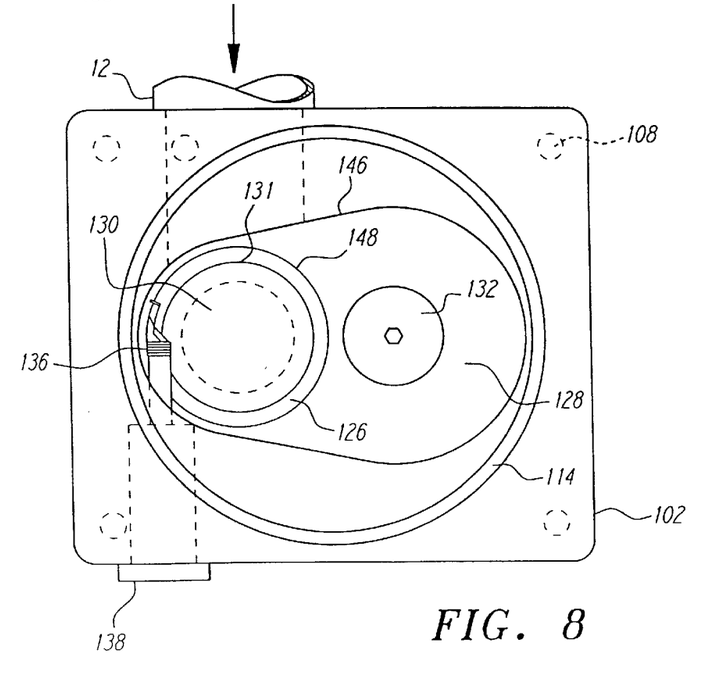
FIG. 8 is a top plan view of the safety valve in a closed position with the valve lid removed.
Figure 9:
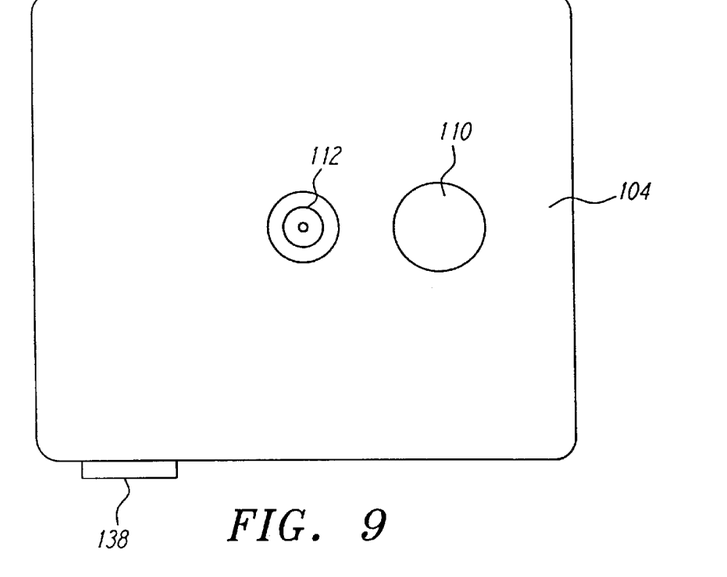
FIG. 9 is a top plan view of the safety valve showing a bubble level and the view port embedded in the valve lid.

Referring now to FIGS. 2 through 8, the valve 100 is described in more detail. As shown in FIGS. 2 and 8, the valve 100 includes a housing 102 which has a gas flow side or portion 123 and a storage side or portion 121. The flow portion 123 is preferably configured so that it acts as an extension of inlet line 12, and more particularly, functions like an elbow that merges the inlet line 12 to outlet line 14 of FIG. 1. Thus when the valve 100 is in an open position as shown in FIG. 2, gas flows from inlet line 12 through the valve inlet opening 116, through the gas flow portion 123 and exits to the outlet line 120 through the valve outlet opening 118.

Figures 4, 5, 6:
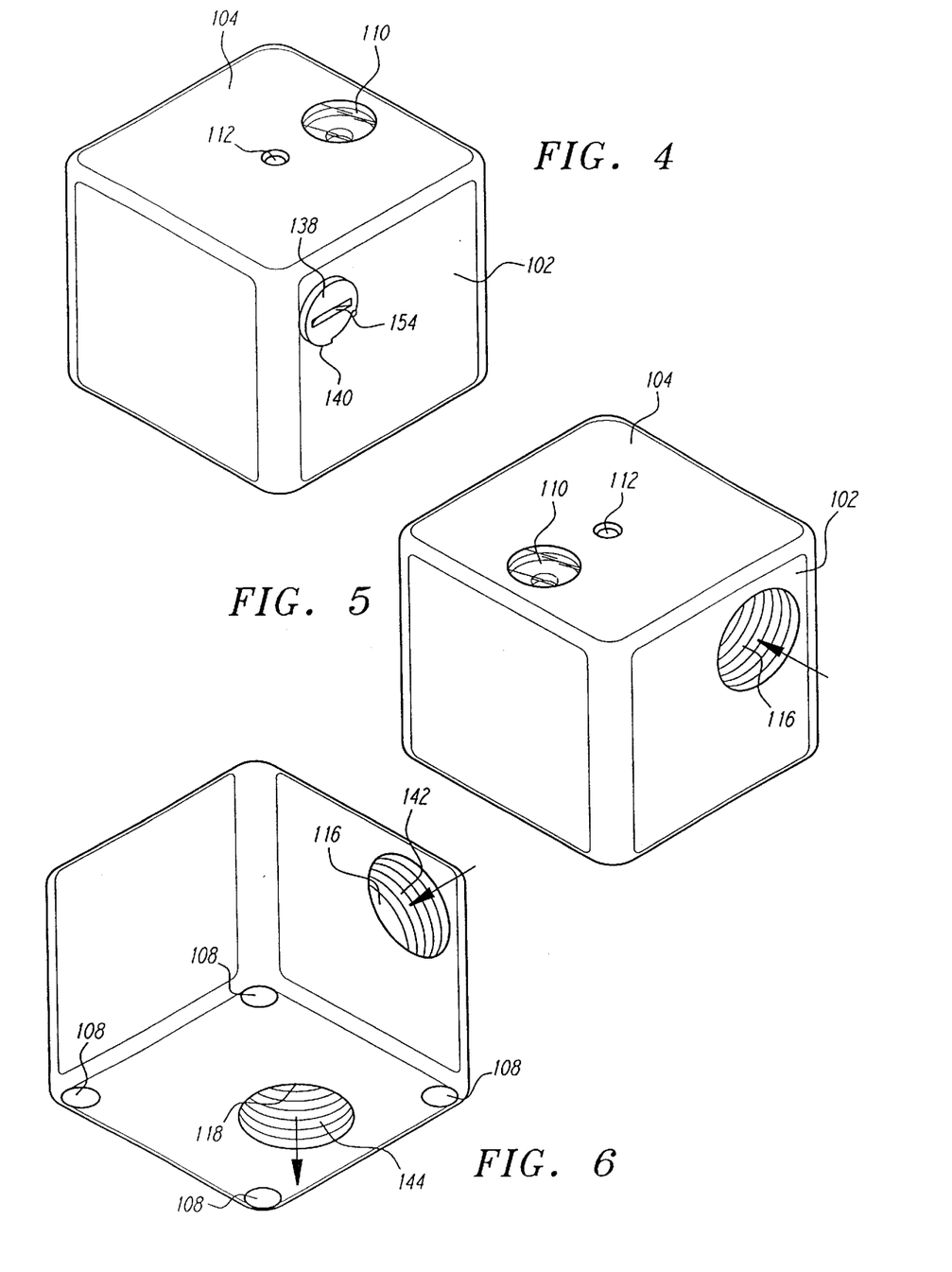
FIG. 4 shows a front perspective view of the safety valve housing.
FIG. 5 shows a side perspective view of the safety valve housing.
FIG. 6 shows a bottom perspective view of the safety valve housing.

As shown in FIGS. 5 and 6, the valve 100 may be easily installed into the gas line by having two threaded openings 142, 144 at the valve inlet and outlet opening 116, 118, respectively. The threaded valve inlet and outlet openings 142, 144 would in turn receive the threaded gas inlet pipe 12 and the threaded gas outlet pipe 14 for an easy and tight fit. The inner diameter of the threaded inlet and outlet holes 142, 144 of valve 100 may assume varying sizes to accommodate varying inlet and outlet line 12, 14 diameters.

To reduce the cost and complexity of placing the valve 100 into the gas line upstream or downstream of the meter 10, the valve 100 is preferably designed and dimensioned such that it may replace a standard pipe elbow in the gas line (typically ¾ inch NPT elbows in the United States). Thus, as shown in FIG. 1 the valve 100 replaces one such elbow in the gas line upstream of the meter 10. Alternatively, the valve 100 may be placed downstream of the meter 10 and replace the pipe elbow 20. To install the valve 100, a portable gas tank is temporarily connected to the line 16 leading into the building or facility, by removing the threaded plug 21. The portable tank is opened to supply gas at low pressure. The main shutoff valve 13 is closed. The elbow on the inlet line 14 is removed and replaced by the valve 100. The valve 13 is opened, the portable gas tank disconnected, and the plug 21 is replaced. Accordingly, this installation may be accomplished without temporarily turning off or otherwise disturbing gas delivery.

This procedure has several advantages which can be achieved due to the design of the valve 100. Initially, since gas supply is not interrupted, pilot lights stay on, and do not need to be relit. This saves on installation time. It also allows the installation to be made when the customer is not home, as no access inside the building is needed. The time and expense of the installation is reduced because only the elbow is replaced. The rest of the piping need not be changed. In addition, little or no gas is lost during installation.

The dimensions of standard pipe elbows are well known. The housing 102 includes those dimensions in the positions and thread sizes shown best in FIG. 6. Specifically, the inlet opening 116 and outlet opening 118 are positioned at right angles, and at the same position as openings on a standard pipe elbow.

The valve housing 102 may be made of any material suitable for use with the gas or liquid passing through. Example materials include cast aluminum, iron, steel or plastics that would not react with the flowing gas or liquid.

The valve housing 102 may comprise a single cast piece or several pieces or segments welded or otherwise attached together.

In a preferred embodiment depicted in FIGS. 2 through 13, the valve 100 comprises of a valve housing 102 and a housing lid 104 which is secured to the valve housing 102 by fasteners 106. The fasteners 106 are inserted in the access holes 108 bored through the valve housing 102, thereby keeping the valve lid 104 securely attached to the valve housing 102. To prevent gas or liquid leakage from the valve housing interior, sealing means may be utilized between the valve lid 104 and valve housing 102. In one embodiment shown in FIGS. 2 and 7, such sealing may be obtained by a suitable O-ring or gasket circumferentially traversing the interface between the valve housing 102 and the valve lid 104.

The operation of the valve 100 is now further discussed with reference to FIGS. 2, 3, 7 and 8. When valve 100 is in an open position as shown in FIGS. 2 and 7, a trip ball 130 may be held in place within the housing storage portion 121 by a ball retainer pedestal 132. In one embodiment, the ball retainer pedestal 132 is made from a flat head socket screw that is secured to a flat housing floor 128. In another embodiment, a pin may be provided as the means to hold the trip ball 130 within the storage portion 121. During an earthquake or other extreme vibration or displacement, the meter 10 along with the safety valve 100 is shaken such that the trip ball 130 rolls over the retainer pedestal (or the pin) 132, down the storage portion 121 and a circumferentially sloped housing outlet flange 126, where the trip ball 130 is generally received by a valve outlet receptacle 117.

When located at the outlet receptacle 117, the trip ball 130 effectively blocks the flow of gas through the outlet line 120 and through the meter 10, and therefore prevents gas from reaching downstream areas in the gas line where the integrity of the line may have been compromised by a leak. To facilitate the closing the valve 100 in the event of a sufficient seismic or other vibration or displacement force, the flat housing floor 128 merges with a surface that is sloped substantially downwards towards the valve outlet opening 118 forming a circumferentially sloped housing outlet flange 126.

Figure 14:
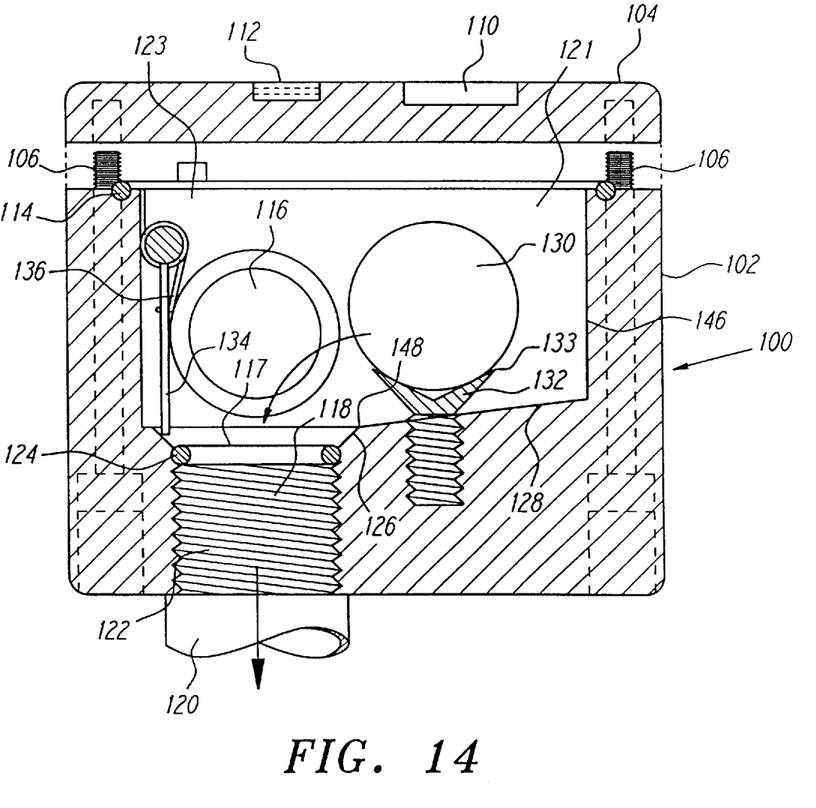
FIG. 14 shows a side view section view of a safety valve with a slightly inclined housing.

In one embodiment, as shown in FIG. 14, the housing floor 128 may be flat. In other embodiments, the housing floor 128 itself may have a downward slope so that the trip ball 130 readily moves towards the gas flow portion 123 and the outlet receptacle 117 due to gravity and into a closed position depicted in FIG. 3. The downward angle of the receptacle 117, the storage portion 121 (and associatedly, the housing floor surface 128) may be preferred because trip ball 130 will automatically roll downward and into the gas flow portion 123 and the outlet receptacle 117, regardless of the direction from which the vibration or displacement associated with an earthquake or other disturbance originates.

The valve outlet receptacle 117 may comprise different components. For example, when in a closed position seen in FIGS. 3 and 8, the trip ball 130 may rest on the circumferentially inclined or sloped housing outlet flange 126. The trip ball 130 is preferably sized so that it seals the gas outlet line 120 to prevent or at least significantly reduce further gas flow. To this end, a suitable gasket or O-ring 124 may be located on or near the outlet flange 126 to provide a secure seal between the trip ball 130 and the valve outlet opening 118. The gasket or O-ring 124 preferably comprises a material that will not react with the gas or liquid intended to flow through the valve 100. And as noted above, because trip ball 130 blocks the outlet in the valve housing chamber, the pressure of the incoming gas in inlet line 12 and in the gas flow portion 123 tends to further seat the trip ball 130 securely in place in its blocked position, shutting off gas flow. While the gas pressure in the valve 100 is nominally low, in the event of a failure of the pressure regulator 15, the pressure could be much higher, so that having the ball seal the outlet, rather than the inlet is important. The weight of the ball alone would not be sufficient to seal the inlet with a failed regulator, while sealing of the outlet would be even more reliable.

Figure 3:
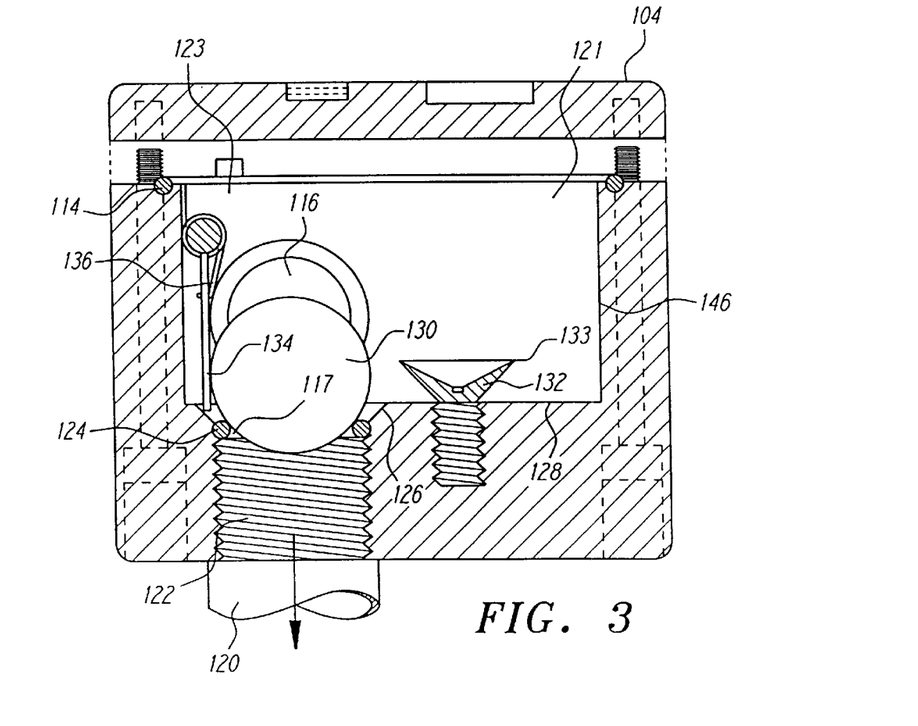
FIG. 3 shows a side section view of a safety valve in a closed position.
Figure 10:
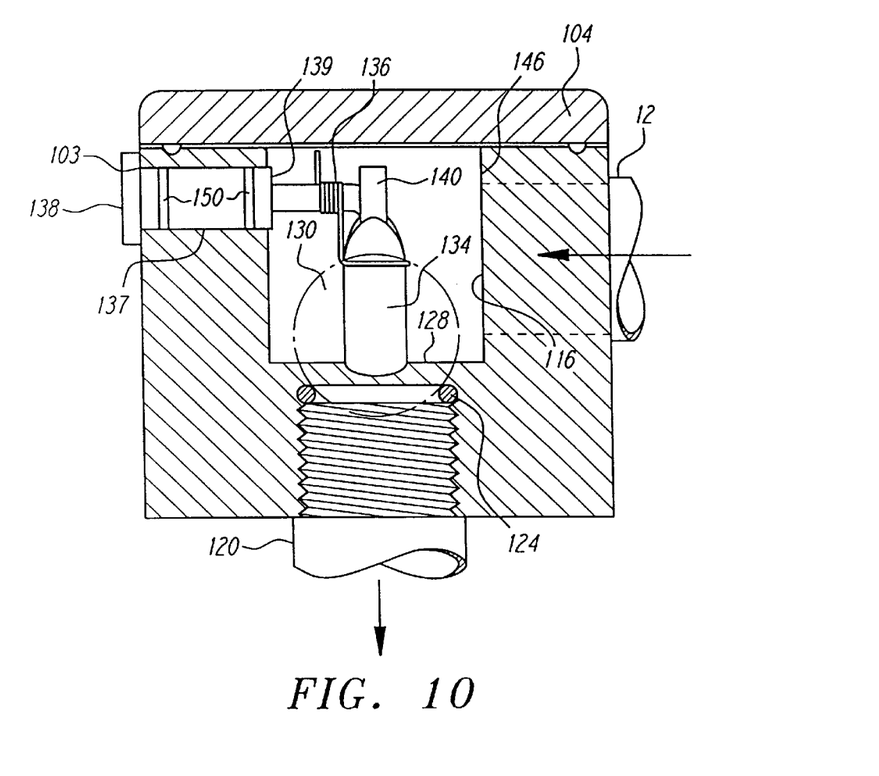
FIG. 10 is a cross sectional view of the safety valve taken along lines 10—10 of FIG. 7 showing the reset paddle actuator.
Figure 11:
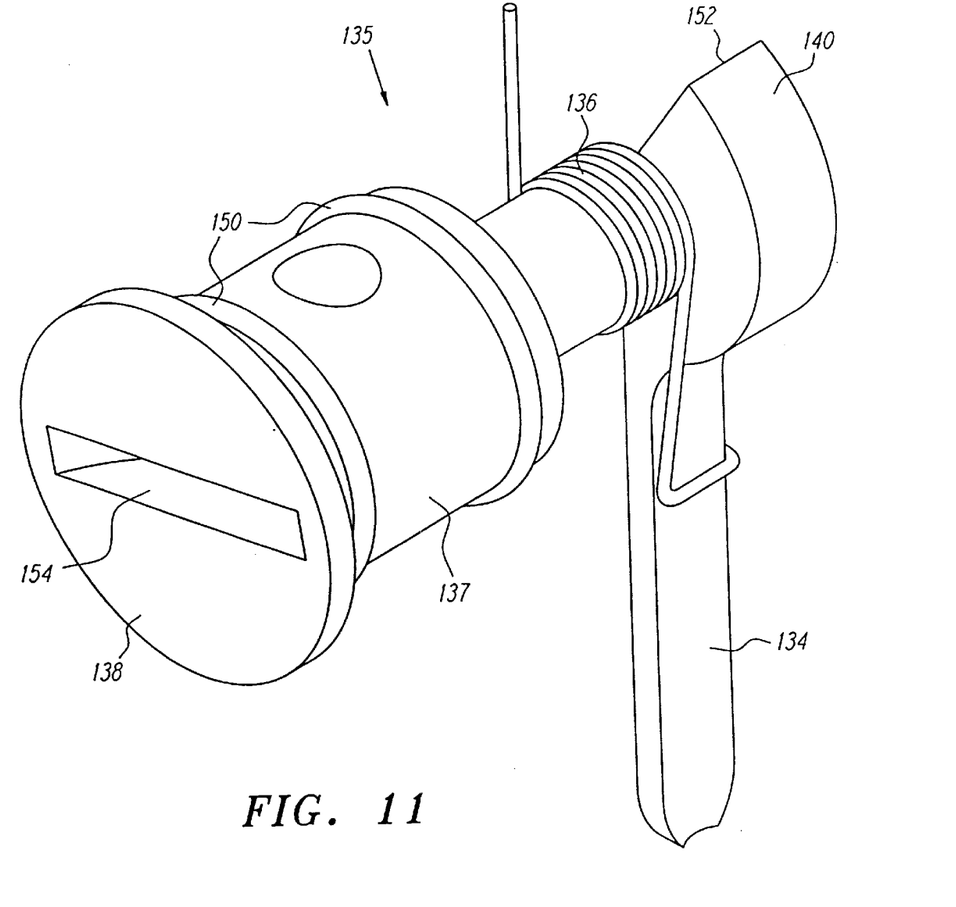
FIG. 11 is a perspective view of the reset paddle actuator.

The trip ball 130 is preferably sized in relation to the valve outlet receptacle 117 so that, as seen in FIGS. 3 and 10, when the valve is in a closed position, the trip ball 130 sufficiently extends below the outlet flange 126, or other device used to seat the trip ball 130, so that the trip ball 130 will not easily become dislodged or unseated. Thus, for example, if the valve 100 ends up in an angled position after an earthquake or other disturbance, the trip ball 130 still remain seated. To this end, it is preferred that the trip ball 130 remains seated even where valve 100 and/or the axis of gas flow portion 123 are angled at up to about 45° from vertical.

Preferably, valve 100 may be adjusted so that only vibrations or displacements above a certain threshold level will activate trip ball 130. Thus in the case of an earthquake, valve 100 may be set so that only earthquakes of some minimum force and acceleration will activate valve 100, e.g., 5.2 on the Richter scale. Adjustment may occur through several factors as described below.

The trip ball retainer pedestal 132 may be adjusted so that it protrudes into the storage portion 121 by varying diameters and concavities. As can be appreciated from FIG. 2, as the diameter and concavity of the retainer pedestal 132 is increased i.e. the depth of the retainer pedestal well 132 is increased, more vibration or displacement will generally be required for the trip ball 130 to roll thereover. In this manner, the retainer pedestal 132 may also be set so that while an earthquake of sufficient magnitude will trigger valve 100, an inadvertent bump from a child playing near the meter 10, for example, would not.

Furthermore, the edge or lip 133 of the retainer pedestal 132 may be sharp as shown, or may be rounded, beveled or may assume some other shape. The configuration of the edge 133 of the retainer pedestal 132 may thus be varied to increase or decrease the resistance to trip ball 130 rolling thereover. In another embodiment, the storage portion 121 may include a bowl section on its floor 128 so that the trip ball 130 must overcome an upwardly sloping surface leading to the outlet receptacle 117.

The trip ball 130 should be heavy enough so that it may remain seated in the valve outlet receptacle 117 after valve 100 has been closed. The trip ball 130 may comprise any suitable material including stainless or chrome steel, or any other material that preferably does not react with the gas, moisture in the gas, or liquid that is intended to flow through valve 100.

The reopening of valve 100 is now further described with reference to FIGS. 10 through 13. As better seen in FIG. 10, the housing 102 includes a reset assembly portion 103. The reset assembly portion 103 is preferably a hole with a bore sufficient to receive the reset assembly 135 shown in FIG. 11. The reset assembly 135 includes a reset paddle 134, a reset arm 137, bias means 136, O-rings 150, and a reset paddle actuator 138. The reset paddle actuator 138 has an actuator slot 154 and a cam 140. It is preferred that the reset paddle 134 normally be in a retracted position 156 (as better seen is FIG. 12) so that it does not interfere with the flow of gas through valve 100. To this end, bias means 136 (preferably a spring) is positioned on the portion of the reset arm 137 protruding in the interior of the valve housing 102 and the gas flow portion 123, so that it is somewhat compressed when the reset paddle 134 is in its normal unextended rest position 156. Thus, as seen in FIG. 3, the reset paddle 134 is preferably held away from the trip ball 130 in the closed position, and away from the valve outlet opening 118 when the trip ball 130 is seated on the retainer pedestal 132 (i.e., when the valve 100 is in the open position). Accordingly, the reset paddle 134 may not interfere with the movement of the trip ball 130 into the valve outlet receptacle 117 in case of an earthquake or other disturbance of sufficient magnitude.

As shown in FIG. 10, in one embodiment the reset assembly 135 is dimensioned such that its reset arm 137 tightly and rotatably engages the reset portion 103 of the housing 102. The reset paddle 134 of the reset assembly 135 is dimensioned such that it is capable of symmetrically engaging the trip ball 130 when the valve 100 is in the closed position. To ensure proper sealing of the valve housing 102 interior from the outside, the reset arm 137 is equipped with gaskets or O-rings 150 that circumferentially engage the inner surface of the reset portion 103 of the valve housing 102.

Figure 12:
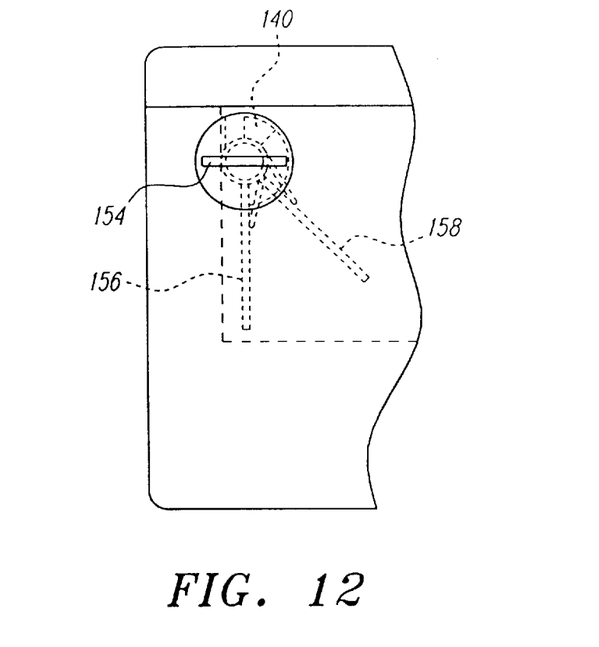
FIG. 12 is a partial side view of the safety valve housing and the reset paddle actuator.
Figure 13:
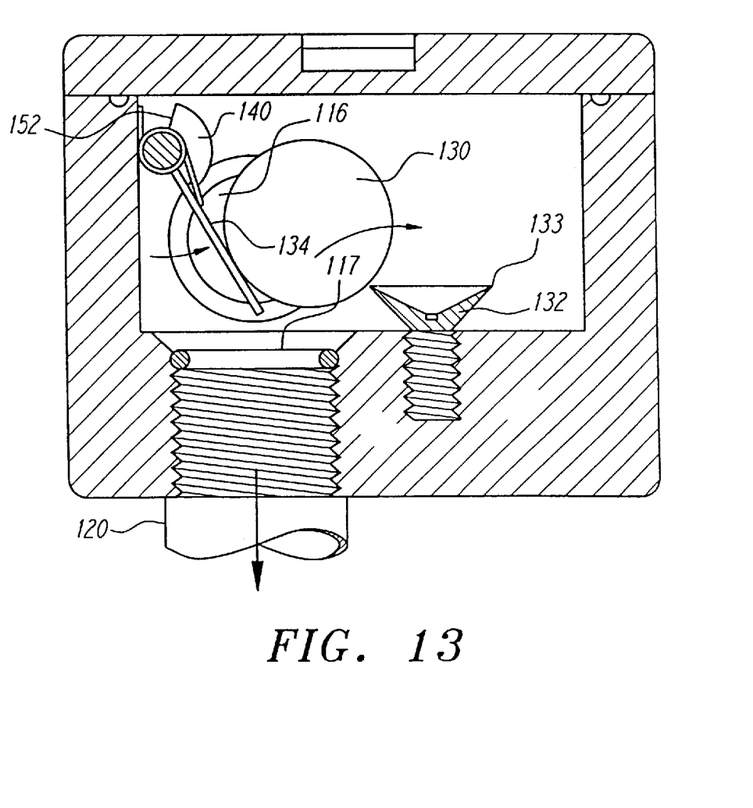
FIG. 13 is a sectional view of the safety valve showing the resetting of the valve trip ball.

To reopen the valve 100, the reset paddle 134, as seen in FIGS. 12 and 13, is rotatably advanced so that it contacts the trip ball 130 and pushes the trip ball 130 far enough into the storage portion 121 so that it rolls over the edge or lip 133 of the ball retainer pedestal 132 and comes to rest therein. To this end, it is preferred that the bias means 136 (preferably a spring) may be compressed enough so that the reset paddle 134 may be advanced a sufficient distance.

As shown in FIGS. 4, 10 and 12, the reset assembly 135 is preferably accessible and thereby adjustable externally to the valve 100. That is, the reset paddle actuator 138 protrudes from the valve housing 102 through the reset opening 139 and may include a cover (not shown). In this manner, an individual need only remove the cover from the reset paddle actuator 138 to reset the valve 100. The reset paddle actuator 138 preferably comprises of an actuator slot 154 which may be manipulated by a coin or simple mechanical tools thereby rotating the reset arm 137 and the reset paddle 134.

The cam 140 on the reset paddle 134 has an angled cam face 152. The cam limits upward movement of the reset paddle, when the cam face 152 contacts the inner wall of the housing. The cam 140 prevents the paddle 134 from pivoting up to a position so high that the ball 130 can roll under the paddle, thereby requiring removal of the lid 104 to reset the valve 100.

In yet another embodiment, shown in FIGS. 4 and 5, the valve lid 104 is provided with a view port 110 so that the user may be able to observe the position of the trip ball 130. Although, as indicated above, such a visual observation is unnecessary for achieving a successful reopening of the valve 100.

When the valve 100 is in the open position (as seen in FIGS. 2 and 7) it is preferable to maintain the housing 102 in a level position such that the trip ball 130 becomes dislodged from the retainer pedestal 132 at or about the desired disturbance threshold. In an embodiment, the valve lid 104 is provided with a bubble or equivalent level 112 which may assist the user in leveling the valve 100.

It is clear from the foregoing disclosure that while particular form of the invention have been illustrated and described, various modifications may be made without departing from the spirit and scope of the invention. Accordingly, it is not intended that the invention be limited to the foregoing disclosure except as by the appended claims.

What is claimed is:

1. A shut-off valve for retrofitting in place of a 90° elbow comprising:

a housing having a flow portion in the configuration of said 90° elbow, said flow portion having a threaded fluid inlet formed along an inlet axis and a threaded fluid outlet formed in said housing, said outlet having an axis perpendicular to the inlet axis;

a ball for blocking fluid flow into said outlet when the valve is closed; and a retainer pedestal adjacent said flow portion for seating said ball when the valve is open, said retainer pedestal comprising a screw having a head and a threaded portion which threadably engages said housing and said screw head having a concave surface for receiving said ball;

wherein the fluid flow presses said ball directly against said outlet when the valve is closed.

2. The shut-off valve of claim 1, wherein said housing has a flat bottom surface inclined slightly toward said fluid outlet.

* * * * *